US005769601A

United States Patent [19]

Agné et al.

[11] Patent Number: 5,769,601
[45] Date of Patent: Jun. 23, 1998

[54] METHOD AND ARRANGEMENT FOR PALLETIZING SUBSTANTIALLY CYLINDRICAL OBJECTS

[76] Inventors: Weine Agné, Algatan 28, S-565 33 Mullsjö; Åke Ljungqvist, deceased, late of Norrahammar; by Jenny My Ljungqvist, administrator, Bergsgatan 12, S-562 32 Norrahammar, all of Sweden

[21] Appl. No.: 726,294

[22] Filed: Oct. 4, 1996

[51] Int. Cl.[6] ................................................ B65G 57/18
[52] U.S. Cl. .................. 414/799; 414/792.5; 414/789.5; 206/386
[58] Field of Search ................................ 414/900, 910, 414/911, 791.7, 789.5, 792.3, 792.5, 799; 206/386, 446

[56] References Cited

U.S. PATENT DOCUMENTS 4,079,645  3/1978  Nunes et al. ......................... 414/789.5
4,439,097  3/1984  Mebus .................................. 414/789.5

FOREIGN PATENT DOCUMENTS

| 384869 | 8/1980 | European Pat. Off. ............ 414/792.5 |
| 47739 | 7/1973 | Finland . |
| 0370886 | 1/1991 | Sweden . |
| 1312039 | 5/1987 | U.S.S.R. .............................. 414/789.5 |

*Primary Examiner*—Karen B. Merritt
*Assistant Examiner*—Gregory A. Morse
*Attorney, Agent, or Firm*—Jeffrey Slusher

[57] ABSTRACT

Substantially cylindrical items are stacked in layers on a pallet. One or more sheets of paper, foil, or webbing is laid out on and around the items in a pattern of loops in such a way that the weight of the items themselves acting on the sheet locks the items in place on the pallet, with no need for the sheet to be attached to the pallet. A pick-up arrangement is provided for fetching the items from a supply area, and then placing them in layers onto the pallet. The tension in the paper sheet is controlled to optimize the locking effect while reducing the risk of over-tensioning.

14 Claims, 5 Drawing Sheets

METHOD AND ARRANGEMENT FOR PALLETIZING SUBSTANTIALLY CYLINDRICAL OBJECTS

BACKGROUND OF THE INVENTION

1. Field of the Invention

This invention relates to a method and an arrangement for palletizing substantially cylindrical objects that are to be locked onto the pallet with a paper band or other film- or web-like material, which is laid as a loop on and among the objects.

2. Description of the Related Art

When loading goods onto loading pallets, one wishes to use the available surface of the pallet and the volume above it as fully and efficiently as possible. The load should therefore, if possible, be laid so that it covers the entire surface of the pallet and fills the space located vertically above the pallet as much as possible. When the load consists of generally cylindrical objects whose diameter is significantly less than the length or breadth of the pallet, and when all of these objects are to be laid in the same direction in layers on top of each other, then the objects must be held in place in some manner so that they do not fall off of the pallet.

One way to secure and lock the objects onto the pallet as desired is to lay a band of paper or of some other web material in loops in and on the objects. Such a band is laid according to a particular pattern, which is adjusted in part to the characteristics of the objects themselves and in part with respect to the desire that the ends of the band should be locked solely by cooperation with the objects, without them having to being fastened to the loading pallet. It is also essential that the band should be stretched properly, since tension that is either too high or too low can cause the objects to move during subsequent transport.

Palletizing objects of this type and laying out the locking band has hitherto been a task performed manually. This is not only time-consuming, but also individual variations easily arise, especially when it comes to tensioning the band used for locking the objects.

What is needed is an arrangement and a method for automatic loading substantially cylindrical objects onto loading pallets or corresponding load carriers that is efficient with respect to use of both time and space. The object of this invention is, accordingly, to provide such an arrangement and method.

SUMMARY OF THE INVENTION

The invention provides for loading substantially cylindrical items onto a load carrier, such as a pallet, or even the bed of a truck. The items are picked up from a supply position and are placed as stacked layers onto the carrier at pre-determined lateral positions. At least one first layer of items placed on the carrier is separated into first and second partial base layers. A first base portion of a locking material—such as one or more continuous sheets of paper or plastic, or webbing—is laid across the carrier underneath the first layer of items. A partial top portion of the locking material is then laid as a loop around an outermost item in the first partial base layer of the items and over all the items in the first partial layer of items. A return portion of the locking material is then laid as an extension of the partial top portion underneath the second partial base layer of items, on top of the base portion, and as a loop around an outermost item in the second partial base layer of items. The base portion, the partial top portion, and the return portion forming a first continuous locking loop of the locking material, the first partial layer of items thereby being surrounded by the locking material.

In a preferred embodiment, an intermediate base portion of the locking material is preferably laid as a continuation of the return layer of locking material of an immediately underlying layer of items. One entire intermediate layer of items is then placed onto the intermediate base portion of the locking material. An intermediate return portion of the locking material is then laid as a loop around and over all the items in the entire intermediate layer of items.

Furthermore, in the preferred embodiment, at least one upper base portion of the locking material is laid as a continuation of the return portion of locking material of an immediately underlying layer of items. At least one upper layer of the items is then placed on top of the upper base portion of the locking material. The upper layer is separated into a first partial outer layer, a second partial outer layer, and a locking layer containing at least one of the items. The locking layer lies between the first and second partial outer layers of items. An upper return portion of the locking material is then laid as a loop over all the items in the first partial outer layer of items, under and as a loop around and over the second partial outer layer of items, and further as a finishing portion extending over the first partial upper layer of items. The locking layer of items is then laid onto the finishing portion of the locking material.

To lay out the locking material, the invention supplies the mainly sheet-like or web-like locking material on a rotating roller mounted on a shaft. The roller and shaft are preferably mounted on a car that moves laterally over the pallet.

In the preferred embodiment, exit tension of locking material from the roller is measured or estimated and is adjusted as a pre-determined function of the sensed exit tension in order to maintain a pre-determined tension profile in the locking material. In the preferred embodiment, the tension is adjusted by applying an adjustable braking torque to the shaft on which the roller, and thus, the locking material, are mounted. A preferred processor-controlled shaft brake and torquing arrangement is provided to carry out this operation.

In sensing the tension, a pre-determined distance parameter is preferably measured that is proportional to the amount of locking material remaining on the roller. This parameter is preferably the diameter, radius, or remaining thickness on the roll of locking material. In the preferred embodiment, the sensor is a arm, which contacts the outer surface of the roll of locking material. The angular position of the arm is sensed by a position encoder, whose output signal is received and used by the processor to compute the torque (or force) on the locking material, the roller, or its shaft, that adjusts the tension of the material to be according to the desired profile.

DETAILED DESCRIPTION

The invention is suitable for loading and securing different types of substantially cylindrical objects or items onto a pallet or other upwardly open, mainly flat load carrier. It is advantageous if the items are roughly circular in cross section, since they then will stack stably and predictably. Other cross sections, are, however, possible. Examples of substantially cylindrical items that frequently require efficient loading onto pallets are tubes, pipes and conduits. Merely for the sake of simplicity and economy of language, all such substantially cylindrical items are referred to below as the "cylindrical items," or simply as the "items" 10, and the load carrier is assumed to be a pallet 12.

Figure 1:
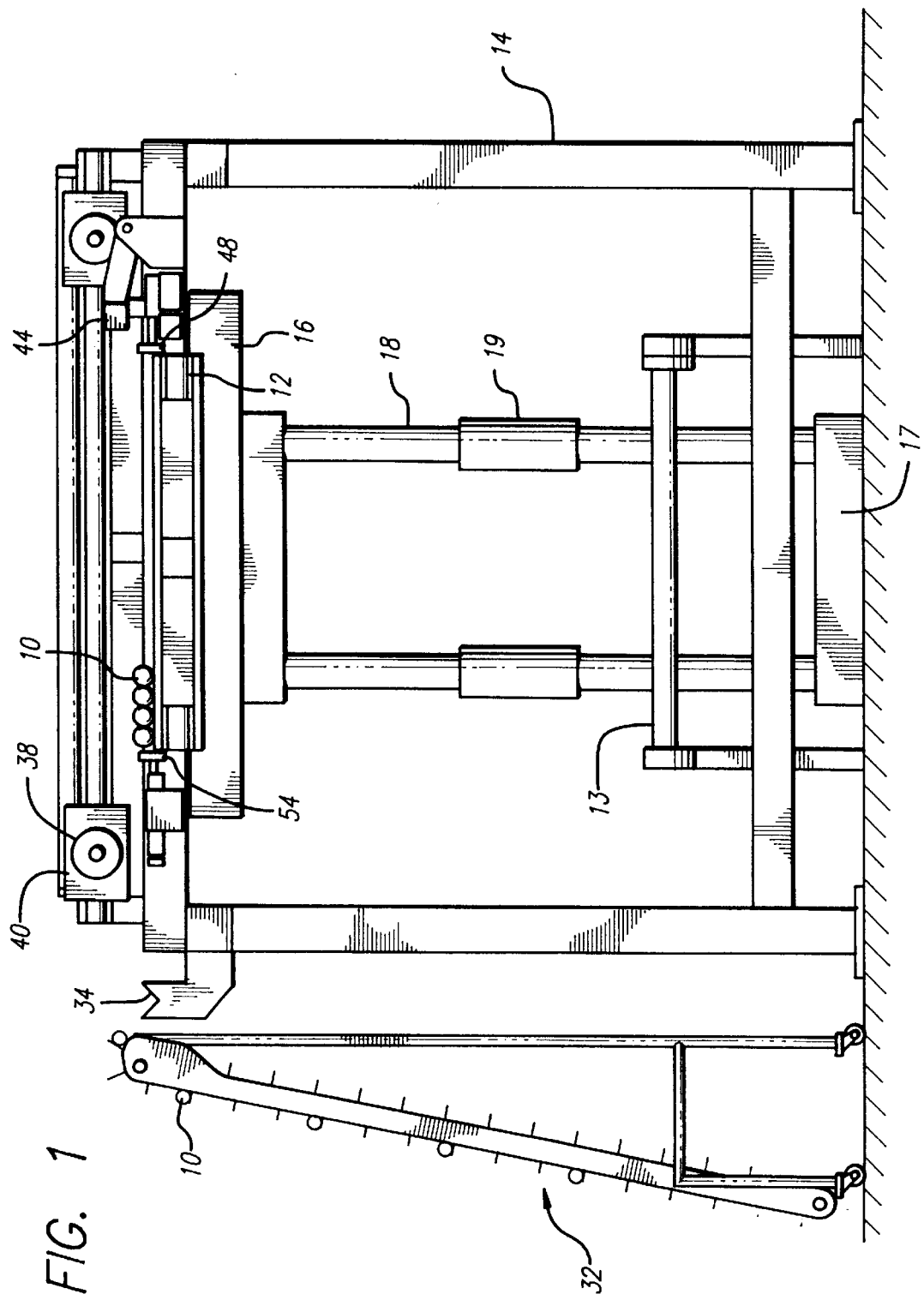
FIG. 1 is a view of one side of an arrangement according to the invention.
Figure 3:
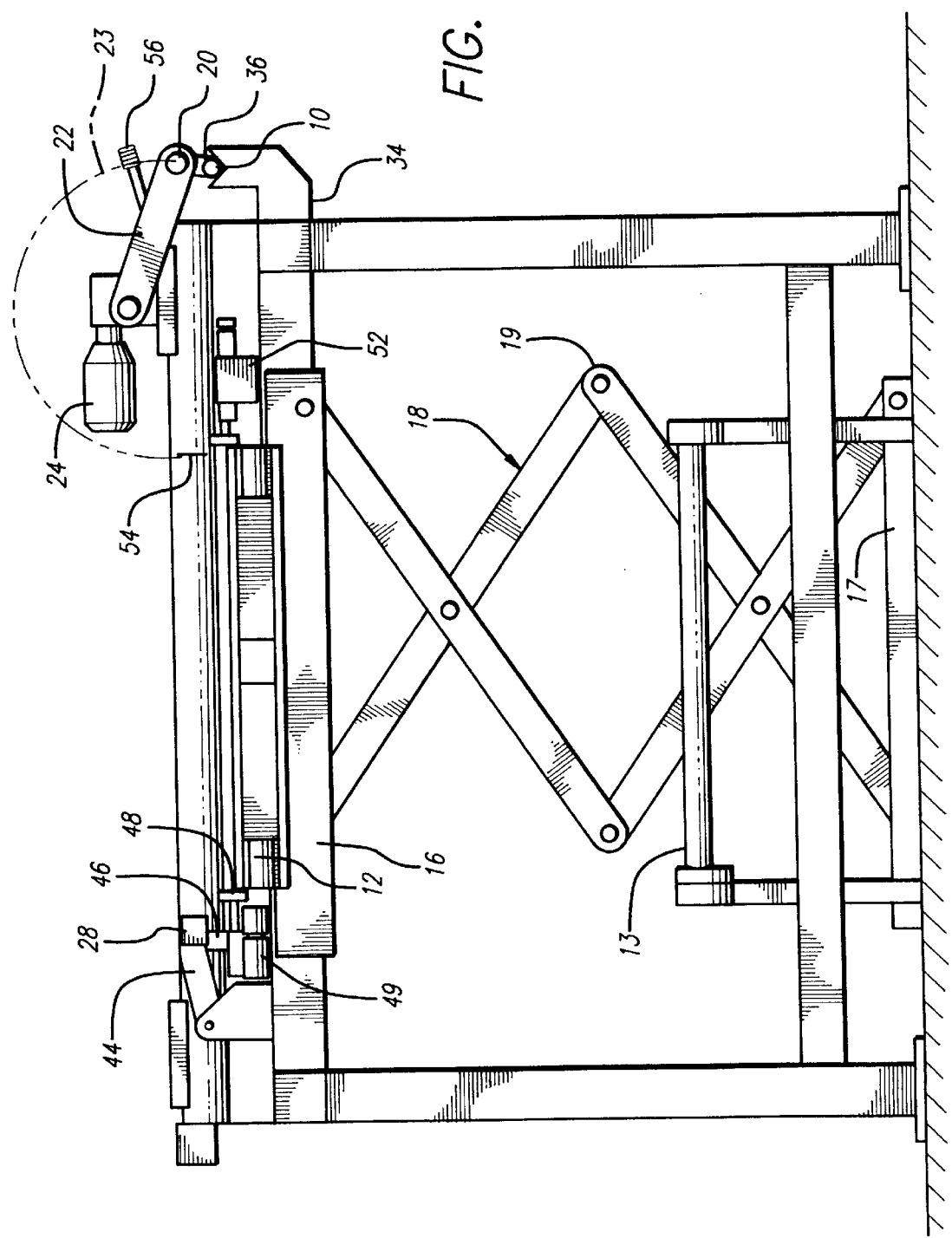
FIG. 3 shows the device in FIG. 1 viewed from the other side.

Refer to FIGS. 1 and 3. The arrangement according to the invention is supported by a framework 14, which can be left free-standing. Further, there is a lifting table 16, which is supported by a lifting arrangement 18 whose height is continuously adjustable. In the preferred embodiment of the invention, the lifting arrangement includes hydraulically actuated scissor legs, with knee joints 19. The extension of the legs 18, and thus the height of the table 16, is controlled via a conventional hydraulic actuator 17, which, if not manually operated, will include a position sensor of any known type. One advantage of the scissor-leg lifting arrangement is that, when retracted, it folds into a vertically compact space and can be easily transported. substantially Other lifting arrangements may, however, also be used. These include conventional hydraulically or pneumatically driven cylinders that control a vertically extending pillar (operating on the same principle as, for example, lifts used in automobile repair shops); and rack-and-pinion, worm-gear, and gear-driven lifting jacks, driven both by pressurized fluids or electrically, which are mounted on one or more vertical legs and are synchronized in any known manner.

Pallets are delivered to the arrangement on a frame 13, so that the lifting table 16 can be lowered beneath the level of the frame 13 and then rise and carry an unloaded upward for loading. Loaded pallets may then be lowered onto and easily removed from the frame, for example by a forklift truck.

The lifting table 16 supports the loading pallet 12, on which the cylindrical items 10 are to be laid. Above and on the framework, there is a pick-up arrangement (including members 20, 22, 24 described below) for laying the items onto the pallet, as well as a holding and dispensing arrangement for a paper roll 38, and a cutting arrangement (including members 28, 44, and 46), both of which are described further below. The pick-up arrangement and the roll holder, along with a corresponding braking arrangement 30, are horizontally moveable in a direction that is perpendicular to the direction in which the cylindrical items are to be placed onto the pallet.

Figure 2:
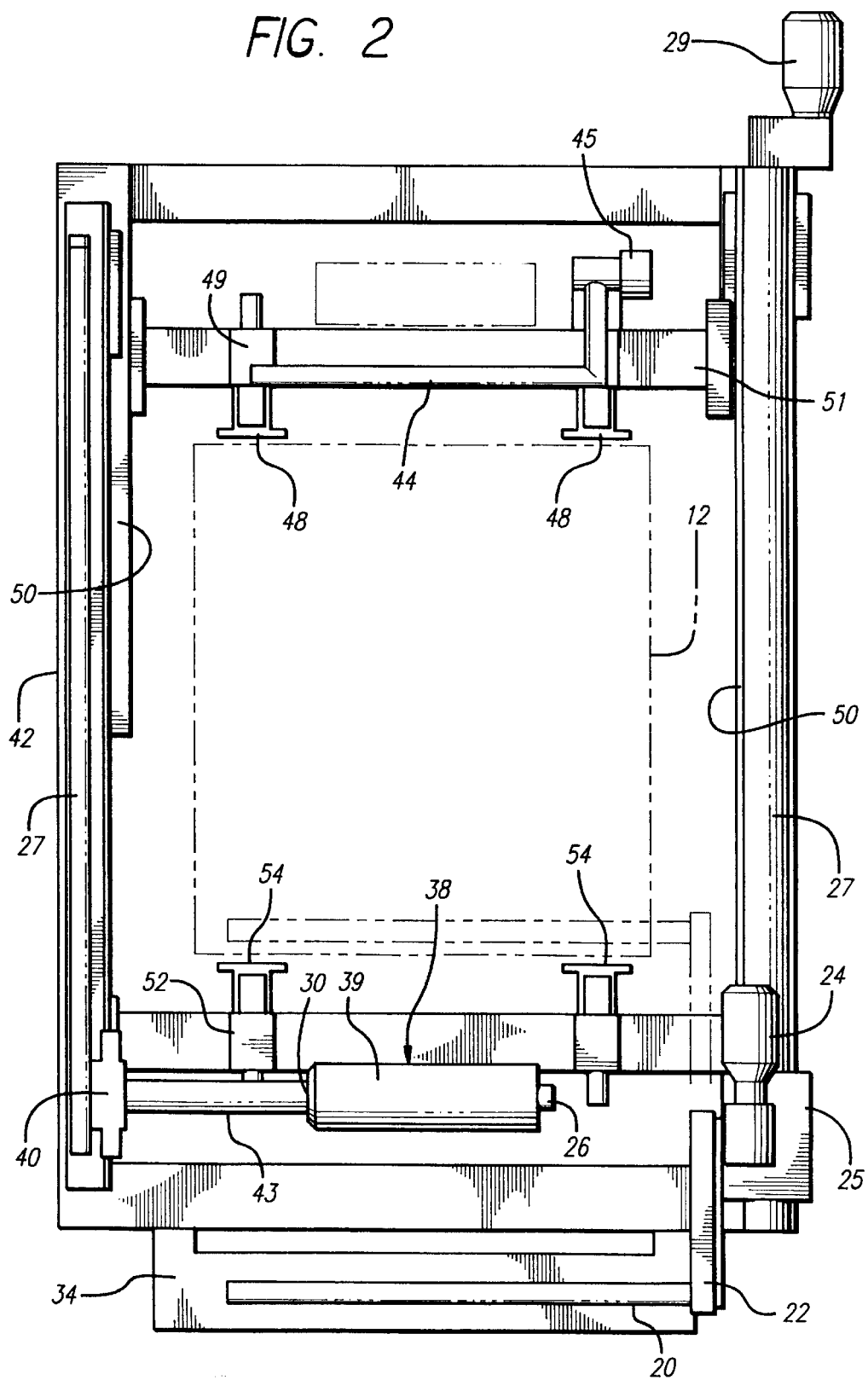
FIG. 2 is a view from above of the arrangement shown in FIG. 1.

Refer to FIGS. 1–3, which show a view from one side, from the top, and from the other side, respectively, of the arrangement according to the invention.

The cylindrical items 10 are fed to the arrangement by means of a conventional transport band or conveyor belt 32 into a slot, rack or trough 34 or some similar conventional arrangement. There, the items are fetched by the pick-up arrangement by means of a pick-up arm 20, which is provided with grippers 36 for securely holding the items. These grippers may be, for example, mechanical grippers, or suction cups that are attached to a vacuum system that is controlled by a conventional actuator and drive circuit.

The pick-up arm 20 is secured to a swing arm 22 (see FIG. 2), which, with the help of a motor 24, is actuated to carry out a rotating motion as shown by the dashed line 23 in FIG. 3. The pick-up arm is thereby arranged to rotate in such a way that the grippers and the items 10 always are located directly under the pick-up arm 20. This can be accomplished, for example, using an arrangement of a known type with toothed gears and a toothed belt, so that the grippers, and thus the item they hold, remain always under the vertical centerline (the axis of rotation) of the pickup arm 20. This avoids back-and-forth swinging of the items. Other arrangements may, however, also be used; for example, the pick-up arm could be mounted in damped bearings in the swing arm 22, so that gravity holds the items in proper position.

The pick-up arrangement rides and is driven by a motor 29 on a car 25 on rails 27 on the upper side of the framework and is programmed to drop off the products in a given sequence in given positions.

In FIG. 2, a roll 38 of paper 39 is shown mounted on a shaft 26. It is this paper 39 that the arrangement according to the invention lays out to lock the items onto the pallet. Paper is not, however, necessary according to the invention. For example, a plastic film or some woven material may also be used. It is also possible—albeit not necessary—for the paper or film to have, or be rolled up together with, a layer of adhesive, in order to increase the locking effect of the paper. Moreover, instead of a single roll, two or more rolls of narrower sheets or webbing (preferably nylon, for strength and low stretch) may be mounted on the shaft 26 and distributed and tensioned by the invention. Solely for the sake of simplicity, the discussion below assumes the use of a continuous sheet of paper delivered in roll form.

A car 40 runs parallel to the pick-up arrangement and has bearings for the shaft 26 that holds the paper roll 38. The car is moved by means of a pneumatic cylinder 42 between extreme positions on either side of the pallet. As the car moves, paper is drawn from the roll 38 and is pulled at least partially over the pallet. This motion is also programmed and for narrower pallets the motion is stopped earlier so that too much paper is not pulled out, with poor tension as a result. The control system also comprises necessary programming for specially dispensing the paper or film that is required to bind the top and bottom layers onto the loading pallet.

The paper roll 38 is held securely on the shaft 26, which is preferably combined with a conventional pneumatic expansion device for holding and releasing the paper roll. The shaft 26 has bearings in a shaft sleeve 43; the shaft and sleeve together support the braking arrangement 30, by means of which the tension in the paper web can be regulated as it is laid out. The braking arrangement may be any adjustable hydraulic, friction, or other device that applies adjustable torque (or, equivalently force) to the paper roll.

A paper cutter 28 is also arranged on the framework and has an arm 44 that can be lifted by means of a pneumatic drive or motor 45. The arm can be lifted so that the paper roll 38 and the paper 39 itself can freely pass underneath. When the paper is to be cut, the arm presses the paper web downward against a stop whereupon a knife 46 or other cutting edge mounted on a pneumatic cylinder cuts the paper off. Thereafter, the paper is held securely, for example, by a non-cutting edge of the cutter arm, until the first layer of cylindrical items is laid on the pallet, whereupon the arm returns and releases the end of the paper.

Associated with the paper cutter, which is mounted on a car 51 or beam that runs or extends between the beams at the top of the framework, there are also two supporting and stopping members 48, which extend and retract driven by pneumatic cylinders 49. These supports/stops 48 form in part a support for the loading pallet when the first layer of cylindrical items is being laid out and in part a support for the layer of cylindrical items that is uppermost at any given time. The car 51, on which the supporting members and the paper cutter are mounted, can move on rails 50 so that its position can be adjusted to the breadth of the pallet. The supporting members are mounted on the car with a certain mobility, so that, for example, they can be retracted using the conventional pneumatic cylinders 49 during raising or lowering of the pallet.

On the opposite side, that is, at the fetching position of the pick-up arm, pneumatic cylinders 52 extend and retract two further supporting and stopping members 54, which are preferably securely mounted in the framework, so that they can retract during raising or lowering of the pallet.

When the pick-up arm 20 has fetched one of the cylindrical items in the pick-up trough or channel 34, the arm is raised and the swing arm 22 assumes its horizontal position. Using, for example, a photocell 56 or other known vacuum-sensing or optical or mechanical pick-up sensor, the arrangement according to the invention checks that the picked up item has followed the arm upward and is located in the correct position. If the system according to the invention does not sense proper pick-up, it preferably attempts pick-up the item one or more additional times, until a pre-determined number of attempts have failed, in which case it indicates this in any known audible and/or visible manner to the user and stops operation until the user has determined and corrected the problem.

Once pick-up has been verified, the car 25 is moved to its programmed drop-off position. During this motion, the arm 20 is moved to a position to the right or left in FIGS. 1 and 3 depending on which side of the pallet the item is to be placed on. The position is chosen so that the item, when it is dropped off, moves towards the most recently placed item. Thereafter, the item is released by reducing the vacuum pressure (in the case where suction from the pick-up arm is used to hold the items), whereupon the pick-up arrangement returns to its initial position.

Figure 4:
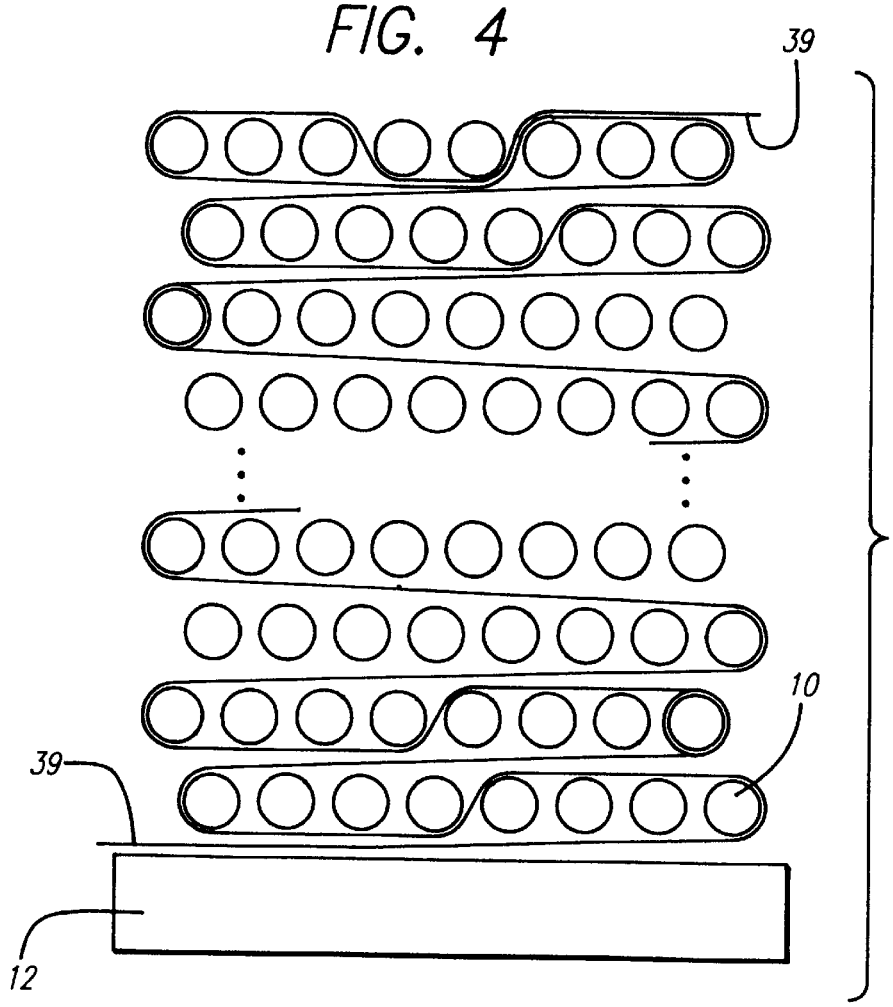
FIG. 4 illustrates how a locking band is laid within a pallet load.

The method according to the invention for laying out the locking paper web is illustrated schematically in FIG. 4. A number of cylindrical items 10 are laid out in layers on the pallet 12. For reasons of even stacking, and to increase the desired locking effect described below, the same number of items is preferably laid in each layer. Except for the lowermost layer and the outermost item in each layer, the items are laid so that they are placed directly above and between two items in the nearest underlying layer.

The palletizing is begun by moving the roll holder from one end position, where the paper cutter is located, to the other end position, at the opposite side of the pallet. During this time, the paper or plastic sheet or other sheet- or web-like material is held securely in the cutting device and paper is then pulled from the roll and laid on the upper side of the pallet. The items and more paper are then laid out and stacked according to a pattern, unique to the invention, that ensures that the items are held on the pallet using their own weight, with no need to fasten the paper to the pallet. This method is described in detail below.

In FIG. 4, the first end position of the roll holder is to the right of the pallet 12; its second end position is to the left.

In FIG. 4, eight cylindrical items are shown in each layer that is stacked on the pallet. This is by way of example only. The number of items in each layer will depend on the diameter of the items relative to the width of the pallet one wishes to cover and may be more or fewer than eight, and may be odd or even. It is also possible for the load to have non-constant numbers of items in each layer, for example, odd-even-odd-even, and so on.

The first step in the loading process is thus that a first layer of paper is laid down on the upper surface of the pallet, from left to right; the roll holder thus will have moved from its second to its first end position, dispensing paper as it goes. After this, one or more, but not all, of the items in the first layer are laid onto the first layer of paper on the pallet. These items are placed by the pick-up arrangement so that they fill the right portion of the layer (viewed as in FIG. 4), with the area to the left remaining open for the time being. For reasons of symmetry, balance, and optimum stability and locking force, it is preferable that half (or as close as possible to half) of the items in the first layer be laid in this first step.

The roll holder then returns to its second end position (to the left, viewed as in FIG. 4), thus pulling more paper from right to left over the items already laid and laying a second layer of paper over the first to the left of the already laid items. The remaining items in the undermost layer are then laid on the pallet, so that the entire layer is in position—the items laid in the first, or right partial layer, and those laid to the left of these as the left partial layer. Note that the items in the left partial layer will press down not only on the portion of the paper sheet that covers the entire surface of the pallet (the undermost paper layer), but also on the portion of the sheet that passes over the right partial layer of items. In this way, the paper web is locked in place over the right partial layer of items.

The second layer of items may be laid and locked in the same manner as the first: The roll holder moves once again to the rightmost position of the pallet, laying down a layer of paper over all of the items in the first, undermost layer of items; the rightmost half (the right partial layer) of the items in the second layer is laid so that each rests on and between the two adjacent underlying items; the roll holder moves all the way to the left; and a left partial layer of items is laid to the left of the first. In this way, the left partial layer of items in the second layer locks not only the right partial layer to its right, but also the left partial layer underneath it, since it lies on and presses down on the paper covering this underlying partial layer. The roll holder then once again moves all the way to the right, drawing the sheet of paper all the way over the second layer.

Note that above and between each adjacent pair of items in the first layer is an item in the second layer, which will press down on the paper covering the first layer and tend to force the underlying two items together, thus more securely locking them in place. Viewed as in FIG. 4, the leftmost item in the second layer does not lie on and between two underlying items. The paper sheet, however, extends below, to the left of, and over top of this item, so that it is not only locked into place, but the item's own weight will tend to tension the paper sheet and increase the locking force on other items in the layer.

In the illustrated embodiment of the invention, after these first two "locking layers" have been laid, remaining intermediate layers (except for topmost layers described below) may be laid all at once, that is, without left and right partial layers. Only a single layer of paper is laid above and below each of these intermediate layers. See the third row from the bottom in FIG. 4. The item farthest to the left has no paper running around its outer side. This item will still be locked in place, however, by being "wedged" in between the two items above it and the two items below it.

According to the invention, any number of layers—one or more—may be laid as two partial layers, with the paper doubled up under one of the partial layers. FIG. 4 shows two such layers—the two bottommost. The number of such "locking layers" needed will depend on the nature and weight of the items to be laid and the friction and strength characteristics of the paper, film, web(s) or other sheet material to be used to lock the items onto the pallet. It is not necessary, according to the invention, for there to be any intermediate layers at all; rather, all layers may have locking loops of paper, with no item ever uncovered on any side. Note that the more layers that are locked, the more paper one will use, since more left and right partial layers will have doubled-up sheets of paper underneath them.

In order to strengthen this further, the next layer is laid in the same way. Each of the layers following these is laid all at once, after which the paper web is laid over the entire layer, so that the outermost tube, which is not supported by two underlying tubes, is held in place by the paper web. This procedure is followed until the layer (or layers—the number may be chosen according to the particular type of items) that is next to the uppermost, where locking is provided in the same way as for the two undermost layers, with the layer being laid as one partial layer of items, a layer of paper, and another partial layer, to complete the entire layer of items.

The paper sheet is preferably laid in a special way in the uppermost layer of items on the pallet, as is shown in FIG. 4: In the uppermost layer, the items are preferably laid as three partial layers—a right partial layer, a left partial layer, and an intermediate partial layer between the right and left. The number of items in each of these three partial layers is preferably about equal, to maximize holding power. If there are enough items in the layer, and the items are heavy enough, however, the intermediate partial layer can have much fewer items than the outer partial layers, even as few as a single intermediate item.

The uppermost layer is laid in a manner similar to the laying of the undermost locking layers, with one exception: A sheet of paper is drawn out underneath the entire layer; the right partial layer is laid; the roll holder moves all the way to the left; the left partial layer of items is placed; and the roll holder moves all the way to the right, laying a sheet of paper completely over the left and right partial layers of items. Between the right and left partial layers, however, there will now be a "gap." The items in the intermediate partial layer are then laid on top of the paper in this gap. These intermediate items will thus press down on the paper between the right and left partial layers, thereby tensioning the paper sheet, urging the items to the left and right towards each other, and locking the uppermost layer onto the pallet.

Note that the entire uppermost layer is held in place solely by the force of friction and tension between the paper sheet above and/or below the items, and by the fact that all but one of the items (the leftmost, viewed as in FIG. 4) in the uppermost layer also rest on and between two underlying items. If the number of items to be loaded onto the pallet is not such as to allow the same number of items to be laid in the uppermost layer as in the other layers, then the uppermost items should be laid as symmetrically as possible on top of the others, and should be divided into right, left and intermediate partial layers with the minimum number of intermediate items needed to provide proper locking; this number can be determined by experience or experiment.

Refer to FIGS. 2 and 3. When loading a pallet, it is first preferably raised to the position shown in FIG. 2, that is, all the way up, so that its loading surface is roughly flush with the level of the roll of paper. After a layer is laid out, the loading pallet is lowered by a distance roughly equal to the diameter of the items, so that the next and subsequently loaded layers of items are always dropped off at the same level.

Figure 5:
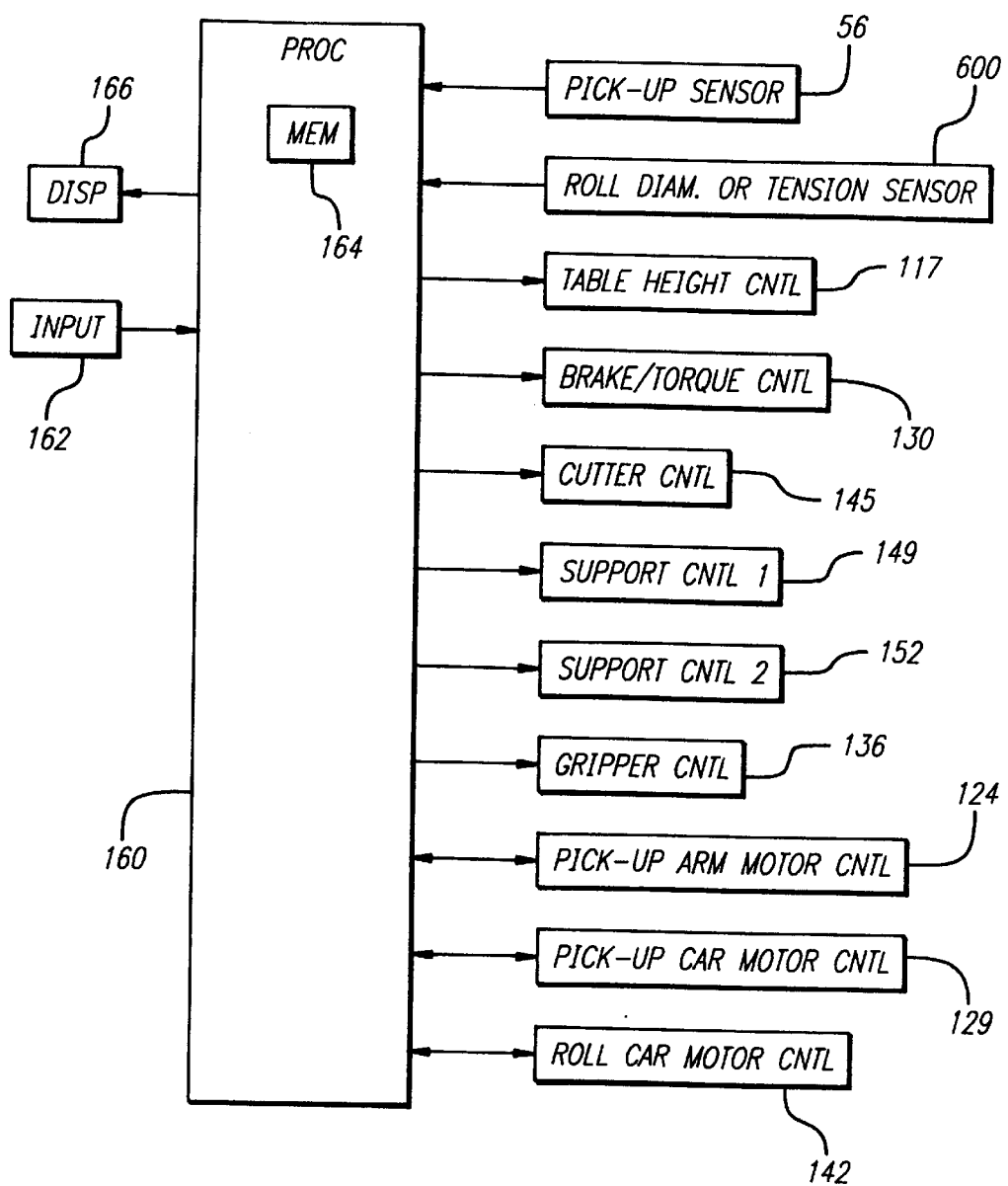
FIG. 5 is a block diagram of a control system according to the invention.

See FIG. 5. The invention includes several motors and other actuators. Conventional control and drive circuitry is provided for each of these devices as follows:

Rotary motor 24 of the pick-up arm 20—Pick-up arm motor controller 124

Motor 29 for the pick-up car 25—Pick-up car motor controller 129

Cylinder 42 or motor for roll car 40—Roll car motor controller 142

Gripping device 36—Gripper controller 136

Actuators 49 for supports 48—Support controller 149

Actuators 52 for supports 54—Support controller 152

Motor or actuator 45 for the cutter 44—Cutter controller 145

Actuator 30 for the braking arrangement—Brake/torque controller 130

Actuator 17 for the lifting table 16—Table height controller 117

These various controllers are connected electrically to a processing system 160 of any conventional type. Depending on the robustness of the system, the processing system may be, for example, a personal computer, a part of a larger computer or network, or a specially designed process-control device designed for the harsh environment that the invention may find itself in. The processor generates actuation signals to each of the controllers so that their respective controlled devices carry out the motions described above. The processor also receives as input signals (from devices shown with two-way arrows in FIG. 5) position signals corresponding to the positions of the respective controlled devices; to this end, conventional position sensors for the various devices may be included in their respective controllers.

The processor 160 is also connected to the pick-up sensor 56 (FIG. 3) and to a position encoder 660 of a roll diameter or torque sensor 600, which are described below with reference to FIG. 6. These devices 56, 660 generate as inputs to the processor 160 electrical signals corresponding, respectively, to whether an item has been properly picked up (as described above), and to the changing diameter of the paper roll.

The diameter of the cylindrical items will, for example, determine how far the lifting table should be lowered after each layer of items is laid, as well as where, horizontally, on the pallet each item is to be laid. The total width of the pallet that is to be covered will determine how far horizontally the paper roll is to travel in order to cover a layer of items, as well as how far the supports/stops 48, 54 are to be extended. The chosen pattern for laying out the paper (for example, how many layers of items are to be laid as partial layers with locking loops of paper and the diameter of the items, will determine when the roll 38 is to be moved in the opposite direction. The characteristics, in particular, the weight, of the cylindrical items, will influence the tension that the braking arrangement will need to apply to the sheet of paper as it is pulled from the roll 38, so that laying an item on the paper to form the beginning of a doubled layer of paper will not overstress and tear the paper. These factors may be entered into the processor using any conventional input device 162, such as a keyboard, before loading of the pallet. The processor may be programmed in any conventional manner to direct pick-up and placement of the items onto the pallet according to the chosen pattern for laying out the locking paper loops. The program, as well as the various input parameters and signal values, are stored in a memory 164. The status of the loading operation may be displayed in any known manner on a display unit 166, to which the processor is connected, depending on the needs of a particular installation.

It is not necessary for the invention to include one single processor that controls all devices. Dedicated controllers and regulators may be implemented instead for the various controlled devices, as long as conventional steps are taken to ensure proper synchronization.

If the braking arrangement 30 applies a constant braking torque to the paper roll 38, then the tension of the paper in the roll will increase as the paper is pulled from the roll and the diameter of the roll decreases. The tension of the paper laid across the upper layers of stacked items would then be greater than the tension on the lower layers. This could in turn lead to too little tension on the lower layers, which would perhaps not be held tightly enough, and possibly too great tension of the uppermost layers, in particular, the very top layer, where the intermediate layer of items is laid directly onto and presses down the tensioned paper; depending on the circumstances, this could cause the paper to rip.

Figure 6:
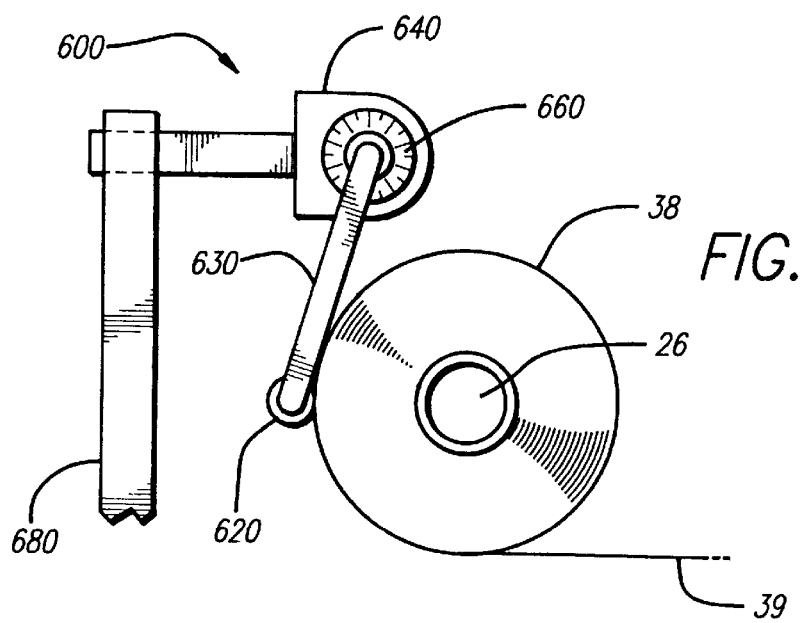
FIG. 6 illustrates a preferred arrangement for sensing the radius or diameter of a roll of paper, film, or other web- or sheet-like material used for locking items onto a pallet.

See FIG. 6. In order to provide more uniform tension on the paper as it is being laid out, the diameter of the paper roll 38 is preferably continuously (or at least frequently) measured. In FIG. 6, a diameter (or radius) sensor 600 includes a roller 620, that is mounted on an arm 630, is journalled in a housing 640, and is either spring-biased or gravity-biased so that the roller 620 lightly contacts the surface of the paper roll 38. The angular position of the arm 620 corresponds to the diameter of the roll 38 at any given time as the paper 39 is pulled from the roll. The sensor 600 is mounted on a bracket 680, which is in turn mounted in any known way so that it moves with and keeps a constant distance from the shaft 26 of the roll.

The angular position of the arm can easily be calibrated to the diameter of the roll using well-known mathematical formulas. Of course, instead of the diameter, equivalent parameters such as the roll's radius, the thickness of the paper on the roll (the total radius minus the radius of the roller; or even the total linear amount of paper used or remaining (given the thickness of the paper, this can be measured or calculated using known formulas) may be measured using either the sensor 600 or similar devices. The position encoder is, as is described above, connected either to the processing system, or to some other conventional regulator, which controls the braking torque on the roll. If the desired pulling force is entered into the processing system, for example, via the input unit 162 (FIG. 5), then the braking torque to be applied to the roll will be approximately equal to the desired force times the momentary radius of the roll. The direction and position of travel of the paper roll may also be sensed and used by the processing system to adjust the tension in the paper in any user-defined manner, depending on the particular loading application. The height of the load may also be used to adjust the tension profile of the locking paper sheet—less tension may, for example, be required for the uppermost layers than for the lower layers, which form supporting layers for the rest of the stacked layers and thus should have as little play as possible. These profiles may be programmed into the processor in any known way—the desired profile will depend on the characteristics of the paper or film to be used, as well as the other characteristics (described above) of the particular application.

It is also possible according to the invention to directly measure the tension in the paper, using known devices such as weighted or spring-loaded calibrated rollers that are applied to the surface of the paper—the farther the rollers are able to press down (or up) the paper sheet, the less the tension in the sheet is.

In the examples of embodiments discussed above a web of paper has been used to lock the items. Other materials, foremost plastic foil, may, however, also be used for this purpose. As is mentioned above, two or more bands of, for example, webbing or paper, may be laid out from one or more rolls using the invention; the method of dispensing multiple bands, and for holding, laying out, and cutting them, may be the same as for the single locking sheet.

The invention works best with items that have a roughly circular cross-section, since such items will roll and stack in an orderly, predictable and stable manner. Other cross-sectional shapes are, however, possible for the items to be loaded as long as the loading mechanism, that is, the pick-up arrangement, the pick-up arm, and the car are controlled so as to stably stack layers of these items onto one another.

It is not necessary for the load carrier to be a pallet. The invention may also be used in other applications where substantially cylindrical or tubular items are to be loaded onto a vertically adjustable carrier. For example, the invention could be used to load logs, pipes, conduits, or tubes (including packing tubes) onto the bed (or some other loading surface on the bed) of a flat-bed truck. In this application, the truck could be driven under the framework 14, and the lifting table could be either the truck's bed itself, or some other lifting device such as a fork lifter.

We claim:

1. An arrangement for loading substantially cylindrical items onto a load carrier comprising:

pick-up means for picking up the items from a supply position and placing the items as stacked layers onto the carrier at pre-determined lateral positions, and for separating at least one first layer of items placed on the carrier into a first partial base layer of items and a second partial base layer of items;

material dispensing means including a supply of a locking material, movable laterally over the carrier, for dispensing a first base portion of the locking material across the carrier underneath the first layers of items by moving from the first to the second end position;

for laying a partial top portion of the locking material as a loop around an outermost item in the first partial base layer of the items and over all the items in the first partial layer of items for laying a return portion of the locking material as an extension of the partial top portion underneath the second partial base layer of items, on top of the base portion, and as a loop around an outermost item in the second partial base layer of items;

the base portion, the partial top portion, and the return portion forming a first continuous locking loop of the locking material, the first partial layer of items thereby being surrounded by the locking material.

2. An arrangement as in claim 1, in which the material dispensing means includes:

a rotating roller that is mounted on a shaft and holds the supply of mainly sheet-like locking material;
tension sensing means for sensing an exit tension of locking material from the supply; and
tension-adjusting means for adjusting the tension of the locking material as a pre-determined function of the sensed exit tension of the locking material and for maintaining a pre-determined tension profile in the locking material.

3. An arrangement as in claim 2, in which:
the tension-adjusting means comprises brake means for applying an adjustable braking torque to the shaft on which the roller, and thus, the locking material, are mounted; and
the tension-sensing means comprises distance-sensing means for sensing a pre-determined parameter proportional to the amount of locking material remaining on the roller.

4. An arrangement as in claim 1, in which:
the material dispensing means is further provided for laying an intermediate base portion of the locking material as a continuation of the return layer of locking material of an immediately underlying layer of items;
the pick-up means is further provided for placing at least one entire intermediate layer of items onto the intermediate base portion of the locking material; and
the material dispensing means is further provided for laying an intermediate return portion of the locking material as a loop around and over all the items in the entire intermediate layer of items.

5. An arrangement as in claim 1, in which:
the material dispensing means is further provided for laying at least one upper base portion of the locking material as a continuation of the return portion of locking material of an immediately underlying layer of items;
the pick-up means is further provided for placing at least one upper layer of the items on top of the upper base portion of the locking material, and for separating the upper layer of the items into a first partial outer layer, a second partial outer layer, and a locking layer containing at least one of the items, the locking layer lying between the first and second partial outer layers of items;
the material dispensing means is further provided for laying an upper return portion of the locking material as a loop over all the items in the first partial outer layer of items, under and as a loop around and over the second partial outer layer of items, and further as a finishing portion extending over the first partial upper layer of items; and
the pick-up means is further provided for placing the locking layer onto the finishing portion of the locking material.

6. An arrangement for loading substantially cylindrical items onto a load carrier comprising:
pick-up means for picking up the items from a supply position and placing the items as stacked layers onto the carrier at pre-determined lateral positions, and for separating at least one first layer of items placed on the carrier into a first partial base layer of items and a second partial base layer of items;
material dispensing means including a supply of a locking material, movable laterally over the carrier,
for dispensing a first base portion of the locking material across the carrier underneath the first layers of items by moving from the first to the second end position;
for laying a partial top portion of the locking material as a loop around an outermost item in the first partial base layer of the items and over all the items in the first partial layer of items
for laying a return portion of the locking material as an extension of the partial top portion underneath the second partial base layer of items, on top of the base portion, and as a loop around an outermost item in the second partial base layer of items;
the base portion, the partial top portion, and the return portion forming a first continuous locking loop of the locking material, the first partial layer of items thereby being surrounded by the locking material;
in which:
the material dispensing means is further provided for laying an intermediate base portion of the locking material as a continuation of the return layer of locking material of an immediately underlying layer of items;
the pick-up means is further provided for placing at least one entire intermediate layer of items onto the intermediate base portion of the locking material;
the material dispensing means is further provided
for laying an intermediate return portion of the locking material as a loop around and over all the items in the entire intermediate layer of items;
for laying at least one upper base portion of the locking material as a continuation of the return portion of locking material of an immediately underlying layer of items;
the pick-up means is further provided for placing at least one upper layer of the items on top of the upper base portion of the locking material, and for separating the upper layer of the items into a first partial outer layer, a second partial outer layer, and a locking layer containing at least one of the items, the locking layer lying between the first and second partial outer layers of items;
the material dispensing means is further provided for laying an upper return portion of the locking material as a loop over all the items in the first partial outer layer of items, under and as a loop around and over the second partial outer layer of items, and further as a finishing portion extending over the first partial upper layer of items; and
the pick-up means is further provided for placing the locking layer onto the finishing portion of the locking material;
the material dispensing means includes:
a rotating roller that is mounted on a shaft and holds the supply of mainly sheet-like locking material;
tension sensing means for sensing an exit tension of locking material from the supply; and
tension-adjusting means for adjusting the tension of the locking material as a pre-determined function of the sensed exit tension of the locking material and for maintaining a pre-determined tension profile in the locking material;
the tension-adjusting means comprises brake means for applying an adjustable braking torque to the shaft on which the roller, and thus, the locking material, are mounted; and
the tension-sensing means comprises distance-sensing means for sensing a pre-determined parameter proportional to the amount of locking material remaining on the roller.

7. An arrangement for loading substantially cylindrical items onto a load carrier comprising:

pick-up means for picking up the items from a supply position and placing the items as stacked layers onto the carrier at pre-determined lateral positions;

material dispensing means including a supply of a locking material, movable laterally over the carrier for dispensing the locking material under and over each of the stacked layers of items, and between pre-determined pairs of the items in pre-determined ones of the stacked layers;

in which the material dispensing means includes:

a rotating roller that is mounted on a shaft and holds the supply of mainly sheet-like locking material;

tension sensing means for sensing an exit tension of locking material from the supply; and tension-adjusting means for adjusting the tension of the locking material as a pre-determined function of the sensed exit tension of the locking material and for maintaining a pre-determined tension profile in the locking material.

8. An arrangement as in claim 7, in which:

the tension-adjusting means comprises brake means for applying an adjustable braking torque to the shaft on which the roller, and thus, the locking material, are mounted; and the tension-sensing means comprises distance-sensing means for sensing a pre-determined parameter proportional to the amount of locking material remaining on the roller.

9. A method for loading substantially cylindrical items onto a load carrier comprising the following steps:

picking up the items from a supply position and placing the items as stacked layers onto the carrier at pre-determined lateral positions;

separating at least one first layer of items placed on the carrier into a first partial base layer of items and a second partial base layer of items;

laying a first base portion of a locking material across the carrier underneath the first layers of items;

laying a partial top portion of the locking material as a loop around an outermost item in the first partial base layer of the items and over all the items in the first partial layer of items; and laying a return portion of the locking material as an extension of the partial top portion underneath the second partial base layer of items, on top of the base portion, and as a loop around an outermost item in the second partial base layer of items;

the base portion, the partial top portion, and the return portion forming a first continuous locking loop of the locking material, the first partial layer of items thereby being surrounded by the locking material.

10. A method as in claim 9, further including the following steps:

laying an intermediate base portion of the locking material as a continuation of the return layer of locking material of an immediately underlying layer of items;

placing at least one entire intermediate layer of items onto the intermediate base portion of the locking material; and laying an intermediate return portion of the locking material as a loop around and over all the items in the entire intermediate layer of items.

11. A method as in claim 9, further including the following steps:

laying at least one upper base portion of the locking material as a continuation of the return portion of locking material of an immediately underlying layer of items;

placing at least one upper layer of the items on top of the upper base portion of the locking material, and for separating the upper layer of the items into a first partial outer layer, a second partial outer layer, and a locking layer containing at least one of the items, the locking layer lying between the first and second partial outer layers of items;

laying an upper return portion of the locking material as a loop over all the items in the first partial outer layer of items, under and as a loop around and over the second partial outer layer of items, and further as a finishing portion extending over the first partial upper layer of items; and placing the locking layer onto the finishing portion of the locking material.

12. A method as in claim 9, further including the following steps:

supplying the locking material on a rotating roller mounted on a shaft;

sensing an exit tension of locking material from the roller; and adjusting the tension of the locking material as a pre-determined function of the sensed exit tension of the locking material and for maintaining a pre-determined tension profile in the locking material.

13. A method for loading substantially cylindrical items onto a load carrier comprising:

picking up the items from a supply position and placing the items as stacked layers onto the carrier at pre-determined lateral positions;

dispensing a locking material laterally over the carrier under and over each of the stacked layers of items, and between pre-determined pairs of the items in pre-determined ones of the stacked layers;

supplying the locking material on a rotating roller mounted on a shaft;

sensing an exit tension of locking material from the roller; and adjusting the tension of the locking material as a pre-determined function of the sensed exit tension of the locking material and for maintaining a pre-determined tension profile in the locking material.

14. A method as in claim 13, in which:

the step of adjusting the tension includes the step of applying an adjustable braking torque to the shaft on which the roller, and thus, the locking material, are mounted; and the step of sensing the tension includes the step of sensing a pre-determined distance parameter proportional to the amount of locking material remaining on the roller.

* * * * *